Dec. 13, 1960 V. G. B. DUPOUY 2,963,914
LIQUID CONTROLLED VIBRATION PRODUCING DEVICE
FOR VIBRATING SIEVES, SCREENS AND TABLES
AND FOR OTHER APPLICATIONS
Filed Aug. 4, 1958 2 Sheets-Sheet 1
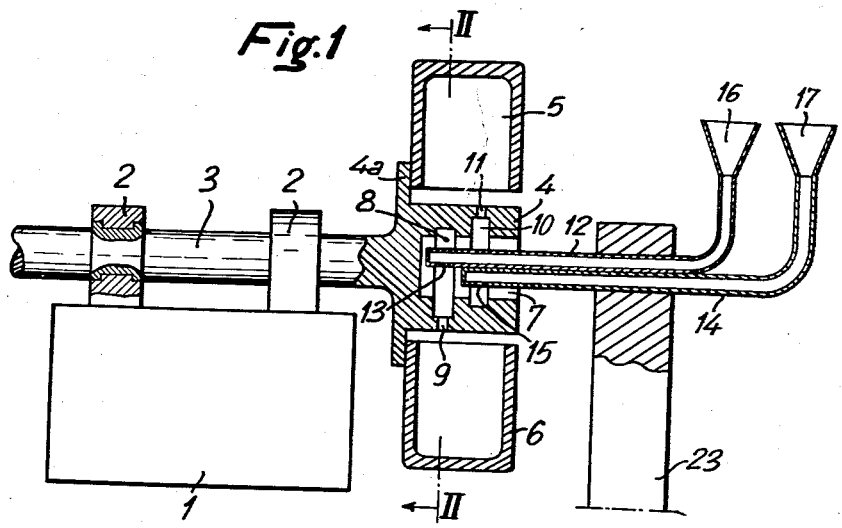
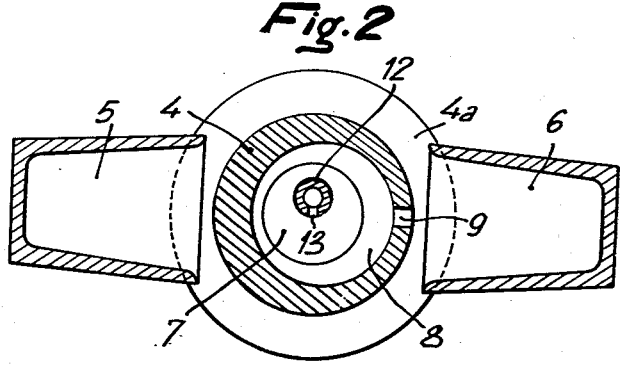
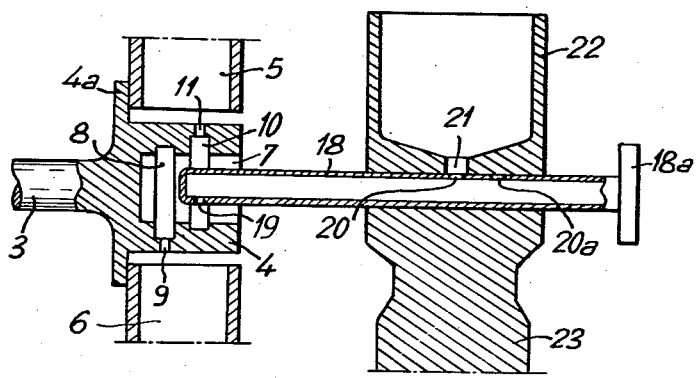
INVENTOR
VINCENT G. B. DUPOUY
Imirie & Smiley
Attys.

INVENTOR

VINCENT G. B. DUPOUY

United States Patent Office 2,963,914
Patented Dec. 13, 1960

2,963,914

LIQUID CONTROLLED VIBRATION PRODUCING DEVICE FOR VIBRATING SIEVES, SCREENS AND TABLES AND FOR OTHER APPLICATIONS

Vincent Gabriel Bernard Dupouy, 11 Rue Berthezene, Alger, France

Filed Aug. 4, 1958, Ser. No. 752,940

Claims priority, application France Aug. 8, 1957

9 Claims. (Cl. 74—87)

The present invention relates to a vibration device that may be used to prevent the blocking-up of screens and sieves, to facilitate the transportation of granular or pulverulent materials along conveyor systems, to improve agglomerate compactness in concrete castings and, generally, for many other applications.

The vibration device of the invention purports to overcome certain deficiencies featured by existing devices, said deficiencies resulting, in particular, from the non-varying intensity of the vibrations generated by said devices, which intensity cannot be altered during the vibrating process, and also from non-controllable large-amplitude motions set up at certain critical speed values of the device, between no-speed and rated speed conditions.

The device of the invention is characterized by a balanced rotor mounted so as to rotate in bearings attached to the mass to be subjected to vibration, said rotor comprising two containers, hereinafter referred to as the "capacities," located in symmetrical opposition, said capacities having each an opening in the direction of the axis of rotation, and a distributing device through which liquid can be admitted, at will, into one or the other aforementioned capacity, while the device is operating.

When the two capacities are empty, the device of the invention can be brought to rated speed without generating vibrations, the device being balanced by construction. Introduction of liquid into either capacity causes a shifting of the center of gravity of the rotor, thereby setting up vibrations, the intensity of which increases as more liquid is introduced into the capacity. The subsequent introduction of liquid into the other capacity causes a reduction of the displacement of the center of gravity relatively to its natural location. It is therefore possible to readily control the intensity of the vibrations, in either a positive or negative direction, during the operation of the device. When a quantity of liquid equal to that filling the first capacity is introduced into the second capacity, the initial balance condition is restored and the vibrations cease, so that the device can be slowed down and stopped without any unwanted vibrations being set up at critical speed values.

One embodiment of the distributing device consists of a ring-shaped body located at the center of the rotor, said body having a cylindrical recess coaxially located with respect to the rotor shaft, the peripheral wall of said cylindrical recess being formed with two circular grooves located in two planes perpendicular to the axis of rotation, each groove being eccentered in diametrally opposed direction relatively to the other, the point of maximum eccentricity at the bottom of each groove communicating with one of the rotor capacities, via a hole through the ring-shaped body, and of a liquid feeding device penetrating axially into the recessed portion of the ring-shaped body and by means of which liquid can be introduced at will into either groove while the rotor is rotating, centrifugal force causing the liquid to flow from the grooves into the capacities.

The liquid feeding device can consist of two stationary tubes fed separately, each tube terminal within the recessed portion of the ring-shaped body having an outlet hole located within the plane of either circular groove in said ring-shaped body.

In another embodiment of the invention, the liquid feeding device comprises a single tube, longitudinally slidable and rotatable about its own axis, the end of said tube located in said ring-shaped body having an outlet hole which can be brought within the plane of one or the other circular groove by translation of said tube along its axis, whereas rotation of said tube about its own axis provides the means of controlling and of stopping the flow of liquid in the tube.

The use of a device in accordance with the aforedescribed embodiments is primarily advantageous when it is desired to obtain stable continuous vibrations over long periods of time, the stopping, draining and restarting sequences being a somewhat lengthy process.

The invention also relates to another embodiment of the device, wherein such device can be utilized as hitherto described or in a different manner suitable to applications necessitating frequent changes and stoppings of the vibrations.

In this other embodiment of the invention, the bottom of one of the capacities is adapted to receive, according to requirements, either a plug or a jet balanced by a counterweight provided at the bottom of the opposite capacity. The distributing device supplying liquid to the first capacity during the operation of the vibration device is in this case preferably equipped with a controlling means, whereas the distributing device supplying liquid to the second capacity is fitted with a shutoff valve.

When such conditions apply and when the device is equipped with the above-mentioned plug, the device can be operated as described in the first two embodiments of the invention.

On the contrary, when fitted with a jet, the device can be operated in the following manner: the liquid is fed solely to that capacity fitted with a jet, thereby causing a flow of liquid through the jet orifice, but also a gradual build-up of the liquid within the capacity with, by way of consequence, the setting-up of vibrations. Conditions of constant vibration intensity are reached when the load across the outlet orifice becomes stabilized, which occurs when the flow of liquid through the jet becomes equal to that through the inlet. The intensity of the vibrations can, at all times, be increased or decreased by control of the inlet flow of liquid into said capacity.

By way of example, three embodiments of the invention, as illustrated on the appended drawings, will be hereinafter described.

Fig. 1 is an axial section of a vibration device according to the invention.

Fig. 2 is a cross section of the same device, along line II—II in Fig. 1.

Fig. 3 illustrates a partial axial section of a second embodiment of the liquid feeding device as applicable to a vibration device similar to that illustrated on Fig. 1.

Figure 4:
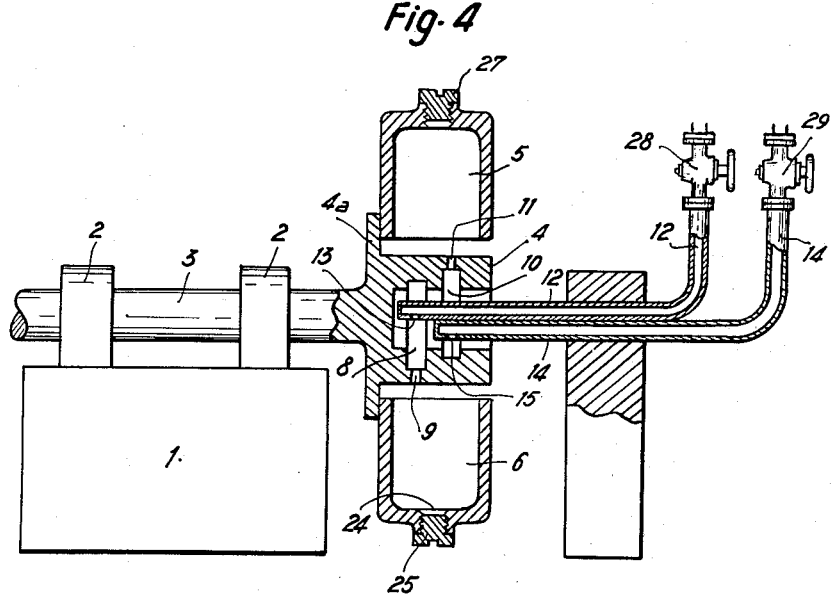
Fig. 4 is a schematical axial section of the third embodiment of the vibration device, suitable for operation in the same manner as the device illustrated in Figs. 1 to 3.

Reference will first be made to Figs. 1 and 2. On the mass 1, which is to be subjected to vibrations, are fixed two bearings 2 in which rotates a shaft 3 driven by a motor (not shown in the drawing). On a flange 4a of said shaft are fixed two identical hollow bodies 5 and 6, in diametrical opposition, said hollow bodies providing the two aforementioned capacities, each having an opening directed towards the axis of rotation of the whole.

The end portion of shaft 3, located between the openings of the capacities 5, 6, carries the ring-shaped body 4 of the liquid distributing device. Said ring-shaped body can be fitted to the head of the shaft 3 or be formed by recessing of said head. The recess 7 of the ring-shaped body 4 is cylindrical and co-axial relatively to the shaft 3. Its walls are formed with two eccentrical circular grooves 8 and 10 located within two planes perpendicular to the axis of rotation. The respective eccenterings of the two grooves are in diametrical opposition. The most eccentered point in the bottom of each groove has a hole, respectively 9 and 11, drilled through the wall of the ring-shaped body 4, the arrangement being such that said holes 9 and 11 face the openings of the capacities 5 and 6.

In order to feed liquid selectively into the grooves 8 and 10 and consequently into the capacities 5 and 6, according to Fig. 1, two stationary tubes 12 and 14 penetrate into the recess 7, both tubes being fed via funnels 16 and 17. The tubes 12 and 14 have closed ends and have lateral holes 13, 15, the arrangement thereof being such that the hole 13 of the tube 12 is located within the plane of the groove 8 and the hole 15 of the tube 14 is located within the plane of the groove 10.

The tubes 12 and 14 are integral with the stationary frame 23. The radial clearance existing between the inner walls of the recess 7 and the ends of the tubes 12, 14 penetrating into said recess exceeds the maximum amplitude of the vibrations to be obtained.

The shape of the capacities 5 and 6 widens out towards their openings so that, when the device settles horizontally in the stopped position (see Fig. 2), the liquid escapes by gravity flow through the gaps provided between the body 4 of the distributing device and the edges of the capacities 5 and 6.

According to the embodiment of Fig. 3, the liquid distributing device comprises a single tube 18, slidable through and rotatable within a cylindrical bore formed in a stationary frame 23. The end of the tube 18 penetrates into the recess 7 of the cylindrical body and has a hole 19 which, by translation of the tube 18, can be located within the plane of one or the other grooves 8, 10.

The frame 23 is topped by a liquid tank 22. The bottom of said tank communicates with the aforementioned cylindrical bore via a passage 21. The sliding tube 18 has two holes 20, 20a separated by a distance equal to that between the grooves 8, 10 and located on the same generatrix, the distance separating the end hole 19 from the middle of the spacing between the holes 20, 20a being equal to the distance separating the middle of the spacing between the grooves 8, 10 from the passage 21.

The outer end of the tube 18 is closed and is fitted with a grip handle 18a serving to impart translation and rotary movements to said tube.

With the handle 18a oriented so as to bring the generatrix passing through the holes 20, 20a in coincidence with the passage 21, suitable translation movements of the tube 18 successively bring the two holes opposite the passage 21 and the port 19 opposite the groove 8 or 10, so that the liquid can be directed, at will, to either capacity 5 or 6.

By imparting a rotary motion to the tube 18, liquid flow can be slowed or stopped at will, the distributing device comprising the tube 18, the holes in said tube, the cylindrical bore of the support and the passage 21 operating in the manner of a rotary plug-cock.

By shifting the tube 18 to the right hand side of Fig. 3, the end of said tube can be pulled clear of the recess 7 of the distributing device so that possible leakage of liquid between said tube and the cylindrical bore within which said tube moves cannot accidentally cause a seepage of liquid into the capacities 5, 6.

Figure 5:
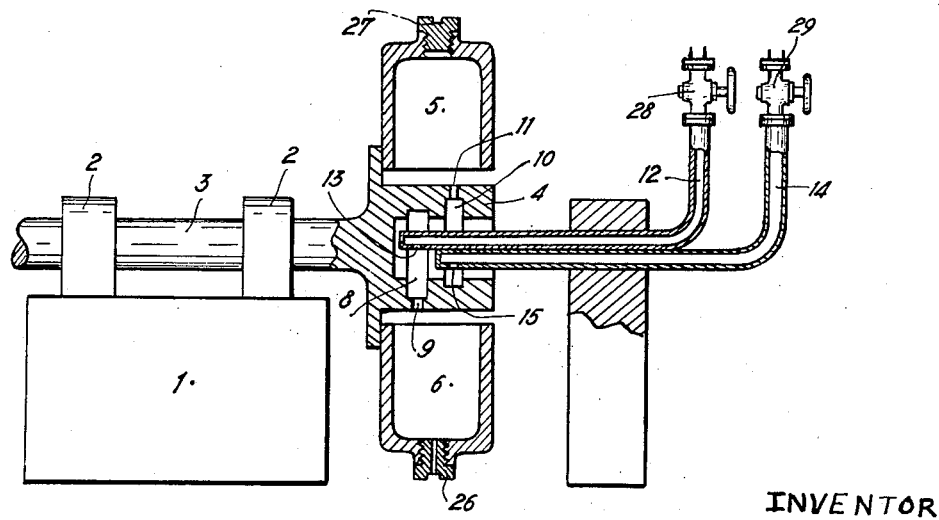
Fig. 5 illustrates, in similar manner, the vibration device of Fig. 4, equipped for the above-mentioned second mode of operation.

On Figs. 4 and 5, as on the preceding figures, 1 designates a mass to be vibrated, 2 the bearings of the shaft 3 of the vibrating device, 4 the rotor body, 4a a flange supporting the two capacities 5 and 6, said capacities being suppliable via tubes 12 and 14 having each a port 13 or 15 respectively, feeding into a groove 8 or 10 which, in turn, supplies the corresponding capacity via a passage 9 or 11.

In this embodiment of the invention, a hole 24 is formed in the bottom of one of the capacities, in the bottom of capacity 6, for example, said hole being fitted, preferably by screwing, with either a plug 25 (Fig. 4) or a jet 26 (Fig. 5). In order to preserve the balance of the device when the capacities are empty, a small weight is provided at the bottom of the opposite capacity 5, said weight consisting, in actual practice, of a screwed plug 27. It is advantageous to utilize a plug 27 identical to plug 25 because, if two identical plugs are utilized, plug 27 can be left in position when the mode of operation changes from that of Fig. 4 to that of Fig. 5. Then, the only requirement will be that the jet 26 be engineered in a manner such that, irrespective of its longitudinal channel 26a, its weight is the same as that of each of the plugs 25 and 27, and its center of gravity is at the same distance from the axis of rotation, a condition which will always be obtainable.

The tube 12 distributing liquid to the capacity 6 is advantageously equipped with a controlling means which may consist of any suitable means, for example a cock 28 which also provides a shutoff function. Naturally, due to the fact that the other capacity is not supplied with liquid in the second mode of operation, the other tube 14 will be fitted with a shutoff cock 29.

When the device is to be operated as described in connection with Figs. 1 to 3, it is equipped as illustrated in Fig. 4. Then the device will operate in the manner described in the case of Figs. 1 to 3.

Alternatively, if the device is to be applied to cases necessitating frequent variations and stopping of the vibrations, it is equipped as illustrated in Fig. 5, the plug 25 being replaced by the jet 26. The device then operates as follows: With the two cocks 28 and 29 closed, the device is set in rotation. When it reaches its rated speed, the cock 28 is opened. Liquid is then fed into the capacity 6, but simultaneously a proportion of the liquid flows out through the orifice 26a of the jet 26. The flow of liquid through said jet, which is a function of the pressure set up by the centrifugal force, increases with the height of the liquid in the capacity 6 measured on the radius passing through the orifice 26a. When said height is adequate to assure a flow of liquid through the jet 26 equal to that through the inlet port 9, said height will become stabilized and the intensity of the vibrations developed by the device will remain constant hereafter.

Any variation of the inlet flow obtained by means of the operation of the cock 28 will cause a variation in the same direction of the liquid height, that is of the liquid mass in the capacity 6, until a new height of said liquid in said capacity 6 determines a pressure such that the flow of liquid through the jet 26 once again equals the flow of liquid through the port 9, said new height corresponding to a new intensity of the oscillations. This intensity will thus be controllable from zero to a maximum value which depends on the volume given by construction to the capacity 6.

To stop the vibrations, it will not be necessary to introduce liquid into the capacity 5, the closing of the cock 28 being the only operation required. The closing of the cock 28 results in a gradual draining of the capacity 6 and, consequently, in the gradual suppression of the unbalance condition.

Obviously, the scope of the invention is not limited to the embodiments which have been described and shown by way of example. The invention also covers any other embodiment based on similar principles, within the scope of the appended claims.

I claim:

1. A vibration device for sieves and screens, for compacting concrete and other applications, comprising bearings means adapted to be attached to the mass to be vibrated, a balanced rotor rotatably mounted in said bearing means, said rotor comprising two diametrally opposite containers communicating with the atmosphere and each having a closed bottom spaced from the rotor axis and an inlet at a point spaced from said bottom, and a distributing device comprising means for feeding liquid through said inlet from an external source at will into either of said containers during rotation of said rotor to displace atmosphere from and establish an imbalance between said containers.

2. A vibration device for sieves and screens, for compacting-concrete and other applications, comprising bearing means adapted to be attached to the mass to be vibrated, a balanced rotor rotatably mounted in said bearing means, said rotor comprising two diametrally opposite containers each of which has a closed bottom at its end remote from the axis of rotation of said rotor and an opening in its portion directed towards said axis of rotation, and a distributing device comprising means for feeding liquid from an external source at will into either of said containers during rotation of said rotor, said distributing device comprising a body located at the center of said rotor and formed with a recess coaxial with said rotor, the peripheral wall of said recess being formed with two circumferential grooves located in two planes perpendicular to the axis of rotation of said rotor, said grooves being eccentered in diametrally opposed directions relatively to each other, the point of maximum eccentricity at the bottom of each of said grooves being formed with a passage leading to said opening of one of said containers, and liquid feeding means penetrating axially into said recess and adapted to feed liquid from an external source at will into either of said grooves.

3. A vibration device as claimed in claim 2, wherein said liquid feeding means comprise two stationary tubes, each of said tubes having an inner end placed inside said recess and an outer end placed outside said recess, said inner end of each of said tubes being formed with an outlet hole located in the plane of one of said grooves, and means for feeding liquid selectively to the outer ends of said tubes.

4. A vibration device as claimed in claim 2, wherein said liquid feeding means comprise a stationary frame, a tube slidably and rotatably mounted in said frame, coaxially with said rotor, said tube having an end located in said recess and formed with a hole which is adapted to be brought into the plane of either of said grooves by sliding said tube in said frame, means on said frame for feeding liquid into said tube, and means for controlling the rate of flow of liquid into said tube by rotation of said tube in said frame.

5. The vibration device of claim 1 comprising plugs removably disposed in the bottoms of said containers.

6. In a vibration device, bearing means to be attached to a mass to be vibrated, a balanced rotor rotatably mounted in said bearing means, said rotor including a container having a closed bottom at one end remote from the axis of rotation of said rotor and with a restricted opening therein, said container having an inlet at a point spaced from said bottom, and weight distributing means including means for feeding liquid from an external source through said inlet to said container during rotation of said rotor, and means for controlling the flow of liquid through said feeding means, whereby upon rotation of said rotor said controlling means may be adjusted to selectively supply said container with liquid at a variable rate of flow relative to that of the liquid discharged through said opening to enable establishment of imbalance and vibration by a greater flow rate or decrease vibration by a lesser flow rate.

7. In a vibration device, bearing means to be attached to a mass to be vibrated, a balanced rotor rotatably mounted in said bearing means, said rotor including a container having a closed bottom at one end remote from the axis of rotation of said rotor, said container having an inlet at a point spaced from said bottom, a plug having an opening formed therethrough and removably disposed in the bottom of said container to communicate said container with the atmosphere, and weight distributing means including means for feeding liquid from an external source through said inlet to said container during rotation of said rotor, and means for controlling the flow of liquid through said feeding means, whereby upon rotation of said rotor said controlling means may be adjusted to selectively supply said container with liquid at a variable rate of flow relative to that of the liquid discharged through said opening to enable establishment of imbalance and vibration by a greater flow rate or decrease vibration by a lesser flow rate.

8. A vibration device comprising bearing means to be attached to a mass to be vibrated, a rotor rotatably mounted in said bearing means, said rotor including two diametrally opposed containers each having a closed bottom at its end remote from the axis of rotation of said rotor and an inlet at a point spaced from said bottom, a plug having an opening formed therethrough and disposed in the bottom of one of said containers to communicate said one container with the atmosphere, and weight distributing means including means for feeding liquid from an external source through the inlet to one of said containers during rotation of said rotor, and means for controlling the flow of liquid through said feeding means whereby upon rotation of said rotor said controlling means may be adjusted to selectively supply said one container with liquid at a variable rate of flow relative to that of the liquid discharged through said opening to enable establishment of imbalance and vibration by a greater flow rate or decrease vibration by a lesser flow rate.

9. A vibration device comprising bearing means to be attached to a mass to be vibrated, a rotor rotatably mounted in said bearing means, said rotor including two diametrally opposed containers each having a closed bottom at its end remote from the axis of rotation of said rotor and an inlet at a point spaced from said bottom, a plug having an opening formed therethrough and disposed in the bottom of one of said containers to communicate said one container with the atmosphere, weight distributing means including means for feeding liquid from an external source through the inlet to one of said containers during rotation of said rotor, and means for controlling the flow of liquid through said feeding means whereby upon rotation of said rotor said controlling means may be adjusted to selectively supply said one container with liquid at a variable rate of flow relative to that of the liquid discharged through said opening to enable establishment of imbalance and vibration by a greater flow rate or decrease vibration by a lesser flow rate, and means mounted on the bottom of the other of said containers for balancing said plug.

References Cited in the file of this patent

UNITED STATES PATENTS

| | | |
|---|---|---|
| 2,534,267 | Kahn | Dec. 19, 1950 |
| 2,659,243 | Darrieus | Nov. 17, 1953 |
| 2,703,490 | Brueggeman et al. | Mar. 8, 1955 |
| 2,722,840 | Kececioglu | Nov. 8, 1955 |
| 2,852,162 | Nauta | Sept. 16, 1958 |